(12) United States Patent
Yokokura et al.

(10) Patent No.: US 11,017,954 B2
(45) Date of Patent: May 25, 2021

(54) SOLID ELECTROLYTIC CAPACITOR AND METHOD OF MANUFACTURING THE SAME

(71) Applicant: JAPAN CAPACITOR INDUSTRIAL CO., LTD., Fussa (JP)

(72) Inventors: Osamu Yokokura, Nagaokakyo (JP); Tomoki Nobuta, Nagaokakyo (JP); Kazutoyo Horio, Nagaokakyo (JP)

(73) Assignee: JAPAN CAPACITOR INDUSTRIAL CO., LTD., Fussa (JP)

( * ) Notice: Subject to any disclaimer, the term of this patent is extended or adjusted under 35 U.S.C. 154(b) by 0 days.

(21) Appl. No.: 16/527,259

(22) Filed: Jul. 31, 2019

(65) Prior Publication Data

US 2019/0355526 A1    Nov. 21, 2019

Related U.S. Application Data

(63) Continuation of application No. PCT/JP2018/003434, filed on Feb. 1, 2018.

(30) Foreign Application Priority Data

Feb. 3, 2017    (JP) .............................. JP2017-018569

(51) Int. Cl.
*H01G 9/012*    (2006.01)
*H01G 9/052*    (2006.01)
(Continued)

(52) U.S. Cl.
CPC .......... *H01G 9/012* (2013.01); *H01G 9/0029* (2013.01); *H01G 9/052* (2013.01); *H01G 9/10* (2013.01); *H01G 9/07* (2013.01)

(58) Field of Classification Search
CPC ............................... H01G 9/012; H01G 9/052
(Continued)

(56) References Cited

U.S. PATENT DOCUMENTS 7,385,804 B2    6/2008    Kuriyama
9,007,743 B2    4/2015    Kawai et al.
(Continued)

FOREIGN PATENT DOCUMENTS

CN    102737857 A    10/2012
CN    104221106 A    12/2014
(Continued)

OTHER PUBLICATIONS

International Search Report issued in PCT/JP2018/003434, dated May 1, 2018.
(Continued)

*Primary Examiner* — Eric W Thomas
(74) *Attorney, Agent, or Firm* — Arent Fox LLP

(57) ABSTRACT

A solid electrolytic capacitor that includes at least one capacitor element having a linear-shaped valve metal substrate that extends in an axial direction and includes a porous portion on a surface of a core portion, a dielectric layer on a surface of the porous portion, and a cathode layer on the dielectric layer; a cathode terminal including a recessed portion having an inner wall surface extending in the axial direction, the capacitor element is disposed in the recessed portion, and the cathode layer is electrically connected to the inner wall surface; an anode terminal electrically connected to the core portion of the capacitor element; and a sealing material covering the capacitor element.

21 Claims, 7 Drawing Sheets

(51) Int. Cl.
*H01G 9/10* (2006.01)
*H01G 9/00* (2006.01)
*H01G 9/07* (2006.01)

(58) Field of Classification Search
USPC .......................................................... 361/540
See application file for complete search history.

(56) References Cited

U.S. PATENT DOCUMENTS

| | | | |
|---|---|---|---|
| 9,666,376 | B2 | 5/2017 | Mishima et al. |
| 2006/0285276 | A1 | 12/2006 | Kuriyama |
| 2011/0292573 | A1* | 12/2011 | Naito ................. H01G 9/012 361/528 |
| 2012/0176727 | A1* | 7/2012 | Ishimoto ............ H01G 9/0032 361/500 |
| 2012/0176731 | A1* | 7/2012 | Murata ................. H01G 9/15 361/523 |
| 2012/0262847 | A1 | 10/2012 | Kawai et al. |
| 2015/0009606 | A1 | 1/2015 | Mishima et al. |

FOREIGN PATENT DOCUMENTS

| | | |
|---|---|---|
| JP | S4919342 A | 2/1974 |
| JP | 2005033813 A | 2/2005 |
| JP | 2006005309 A | 1/2006 |
| JP | 2010021168 A | 1/2010 |
| JP | 2010251643 A | 11/2010 |
| WO | 2005015588 A1 | 2/2005 |

OTHER PUBLICATIONS

Written Opinion of the International Searching Authority issued in PCT/JP2018/003434, dated May 1, 2018.

\* cited by examiner

SOLID ELECTROLYTIC CAPACITOR AND METHOD OF MANUFACTURING THE SAME

CROSS REFERENCE TO RELATED APPLICATIONS

The present application is a continuation of International application No. PCT/JP2018/003434, filed Feb. 1, 2018, which claims priority to Japanese Patent Application No. 2017-018569, filed Feb. 3, 2017, the entire contents of each of which are incorporated herein by reference.

FIELD OF THE INVENTION

The present invention relates to a solid electrolytic capacitor and a method of manufacturing the solid electrolytic capacitor.

BACKGROUND OF THE INVENTION

Patent Document 1 describes an example of a solid electrolytic capacitor that includes a porous sintered body of metal particles or conductive ceramic particles, an anode that is partially inserted into the porous sintered body, and a cathode that is formed on a surface of the porous sintered body. In the solid electrolytic capacitor described in Patent Document 1, the anode includes anode wires, and end portions of the anode wires projecting from the porous sintered body are electrically connected to anode lead members. These are also referred to as anode terminals.

The technology described in Patent Document 1 can improve noise removal characteristics in a wide frequency band and enables a large amount of electric power to be supplied with high responsiveness. Moreover, the technology can improve the space efficiency on a substrate of an electric circuit in which the solid electrolytic capacitor is used and can reduce the cost of the electric circuit.

Patent Document 1: International Publication No. 2005/015588

SUMMARY OF THE INVENTION

As a substitute for the solid electrolytic capacitor described in Patent Document 1, the inventors have studied reducing the number of components and thus the cost by using a liner valve metal substrate as a component that functions as both the porous sintered body and the anode wires. In such a solid electrolytic capacitor, after forming a dielectric layer on a surface of the porous portion of the valve metal substrate, a capacitor element is formed by forming a cathode layer on the dielectric layer, and electrically connecting the cathode layer to a cathode terminal.

However, with the solid electrolytic capacitor having the above structure, it is difficult to obtain a sufficient bond strength between the capacitor element and the cathode terminal because the cathode layer on the linear valve metal substrate is connected to the cathode terminal has a planar shape. This is because when the shape of the valve metal substrate is cylindrical, the contact area between the capacitor element and the cathode terminal is small. If the bond strength between the capacitor element and the cathode terminal is low, when sealing the capacitor element with a sealing material composed of a resin, the capacitor element may easily come off the cathode terminal due to flowing of the resin. Thus, deterioration of electric characteristics, such as increase of resistance, may occur.

In order to increase the bond strength between the capacitor element and the cathode terminal, a method of bonding the capacitor element and the cathode terminal by using a large amount of conductive adhesive may be used. However, as the amount of conductive adhesive increases, the conductive adhesive becomes more likely to leak from the sealing material, and leakage failure may occur.

The present invention has been made in order to solve the above problem, and an object the present invention is to provide a solid electrolytic capacitor in which a capacitor element, including a valve metal substrate having a linear shape, and a cathode terminal are bonded to each other with high bond strength. Another object of the present invention is to provide a method of manufacturing the solid electrolytic capacitor.

A solid electrolytic capacitor according to the present invention includes at least one capacitor element having a valve metal substrate including a porous portion on a surface of a core portion, a dielectric layer on a surface of the porous portion, and a cathode layer on the dielectric layer; a cathode terminal electrically connected to the cathode layer of the capacitor element; an anode terminal electrically connected to the core portion of the capacitor element; and a sealing material that covers the capacitor element. A shape of the valve metal substrate is a linear shape extending in an axial direction. The cathode terminal includes a recessed portion that has an inner wall surface extending in the axial direction. The capacitor element is disposed in the recessed portion of the cathode terminal, and the cathode layer of the capacitor element is electrically connected to the inner wall surface of the recessed portion.

In the solid electrolytic capacitor according to the present invention, preferably, the valve metal substrate has a columnar shape having a curved surface.

In the solid electrolytic capacitor according to the present invention, preferably, the inner wall surface of the recessed portion has a curved shape extending along the shape of the valve metal substrate.

In the solid electrolytic capacitor according to the present invention, preferably, the cathode terminal is made from a metal plate.

Preferably, the solid electrolytic capacitor according to the present invention further includes an insulating layer on a surface of the capacitor element and which insulates the core portion and the cathode layer from each other, and the cathode terminal is in contact with the cathode layer and the insulating layer.

In the solid electrolytic capacitor according to the present invention, preferably, the cathode layer of the capacitor element is connected to the inner wall surface of the recessed portion in a region having a length that is greater than or equal to ⅕ of a length of the capacitor element in the axial direction.

In the solid electrolytic capacitor according to the present invention, preferably, the cathode layer of the capacitor element is connected to the inner wall surface of the recessed portion in a region extending up to a height that is greater than or equal to ⅓ of a height of the capacitor element.

In the solid electrolytic capacitor according to the present invention, a height of the inner wall surface of the recessed portion is preferably greater than or equal to ⅓ of a height of the capacitor element, and more preferably, is greater than or substantially equal to the height of the capacitor element.

In the solid electrolytic capacitor according to the present invention, preferably, the sealing material has a bottom surface and a side surface adjacent to the bottom surface, an outer wall surface of the cathode terminal is exposed at the bottom surface and the side surface of the sealing material, and the cathode terminal is an integral element.

In this case, preferably, in the axial direction, a length of the inner wall surface of the recessed portion is greater than or substantially equal to a length of the outer wall surface of the cathode terminal that is exposed at the side surface of the sealing material.

Preferably, the solid electrolytic capacitor according to the present invention is a three-terminal capacitor that includes a pair of the anode terminals on opposed end surfaces of the sealing material and the cathode terminal is exposed at least on a bottom surface of the sealing material.

A method of manufacturing a solid electrolytic capacitor according to the present invention includes preparing at least one capacitor element having a valve metal substrate including a porous portion on a surface of a core portion, a dielectric layer on a surface of the porous portion, and a cathode layer on the dielectric layer; mounting the capacitor element on a cathode terminal by connecting the cathode layer of the capacitor element to the cathode terminal; sealing the capacitor element mounted on the cathode terminal with a sealing material; and electrically connecting an anode terminal to the core portion of the capacitor element. A shape of the valve metal substrate is a linear shape extending in an axial direction. The cathode terminal includes a recessed portion that has an inner wall surface extending in the axial direction. In the step of mounting the capacitor element on the cathode terminal, the capacitor element is placed in the recessed portion of the cathode terminal, and the cathode layer of the capacitor element is electrically connected to the inner wall surface of the recessed portion.

A method of manufacturing a solid electrolytic capacitor according to another aspect of the present invention includes, preparing a plurality of capacitor elements each of which includes a valve metal substrate including a porous portion on a surface of a core portion, a dielectric layer formed on a surface of the porous portion, and a cathode layer disposed on the dielectric layer; mounting the plurality of capacitor elements on a collective frame by connecting the cathode layers of the capacitor elements to the collective frame; simultaneously sealing the plurality of capacitor elements mounted on the collective frame with a sealing material; a dividing the collective frame to obtain a plurality of individual chips such that a divided portion of the collective frame of each of the plurality of chips is a cathode terminal; and electrically connecting an anode terminal to the core portion of the capacitor element in each of the individual chips. A shape of the valve metal substrate is a linear shape extending in an axial direction. The collective frame has a plurality of recessed portions each of which has an inner wall surface extending in the axial direction.

The present invention can provide a solid electrolytic capacitor in which a capacitor element, including a valve metal substrate having a linear shape, and a cathode terminal are bonded to each other with high bond strength.

DETAILED DESCRIPTION OF THE PREFERRED EMBODIMENTS

Hereafter, a solid electrolytic capacitor according to the present invention and a method of manufacturing the solid electrolytic capacitor will be described. However, the present invention is not limited to the following description and is applicable as appropriately modified within the sprit and scope of the present invention. Embodiments described below are examples, and structures described in different embodiments can be partially replaced with each other or combined with each other. A combination of two or more preferable structures of the present invention described below is also included in the scope of the present invention.

[Solid Electrolytic Capacitor]

Figure 1:
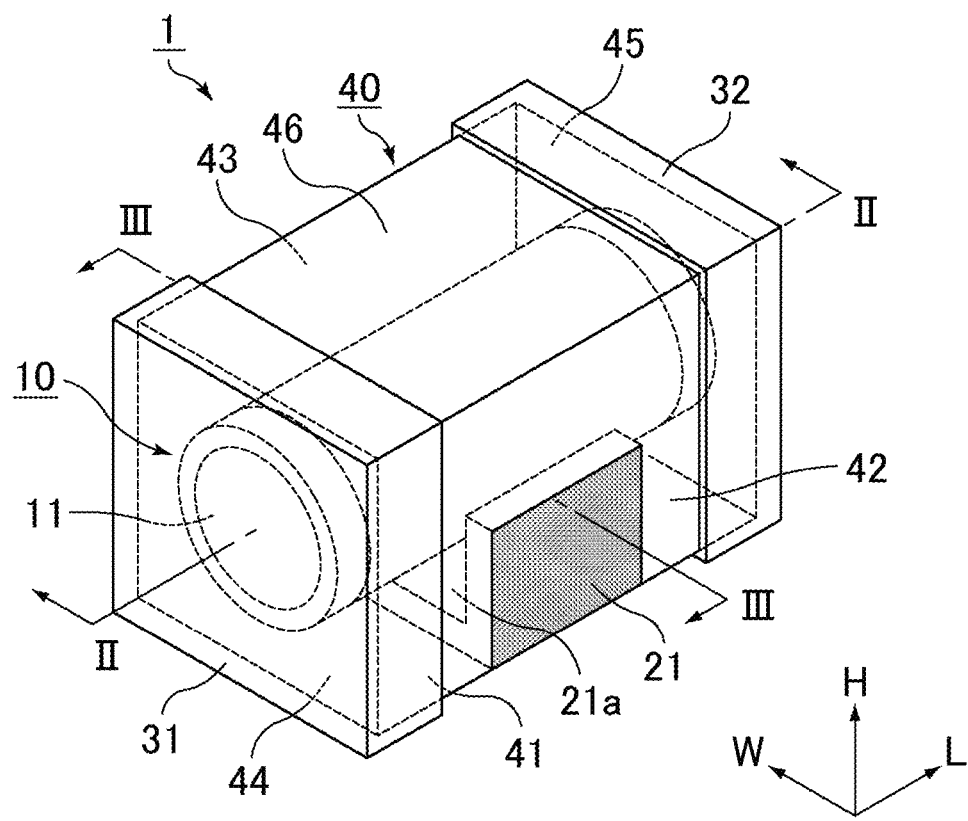
FIG. 1 is a schematic perspective view of a solid electrolytic capacitor according to a first embodiment of the present invention.

FIG. 1 is a schematic perspective view of a solid electrolytic capacitor according to a first embodiment of the present invention. A solid electrolytic capacitor 1 illustrated in FIG. 1 includes a capacitor element 10, a cathode terminal 21, a pair of anode terminals 31 and 32, and a sealing material 40 that covers the capacitor element 10. The capacitor element 10 includes a valve metal substrate 11 having a linear shape extending in the axial direction (a direction indicated by arrow L in FIG. 1).

The cathode terminal 21 includes a recessed portion 21a that has an inner wall surface extending in the axial direction L. The capacitor element 10 is disposed in the recessed portion 21a of the cathode terminal 21.

In the present embodiment, the sealing material 40, together with the cathode terminal 21, has a rectangular-parallelepiped outer shape. The sealing material 40 has the following surfaces: a bottom surface 41 and a upper surface 46, which are paired so as to face each other in a height direction perpendicular to the axial direction L (a direction indicated by arrow H in FIG. 1); a pair of side surfaces 42 and 43 that face each other in a width direction perpendicular to the axial direction L and the height direction H (a direction indicated by arrow W in FIG. 1); and a pair of end surfaces 44 and 45 that face each other in the axial direction L. The side surfaces 42 and 43 of the sealing material 40 are both adjacent to the bottom surface 41 and the upper surface 46, and are also adjacent to the end surfaces 44 and 45.

Figure 3:
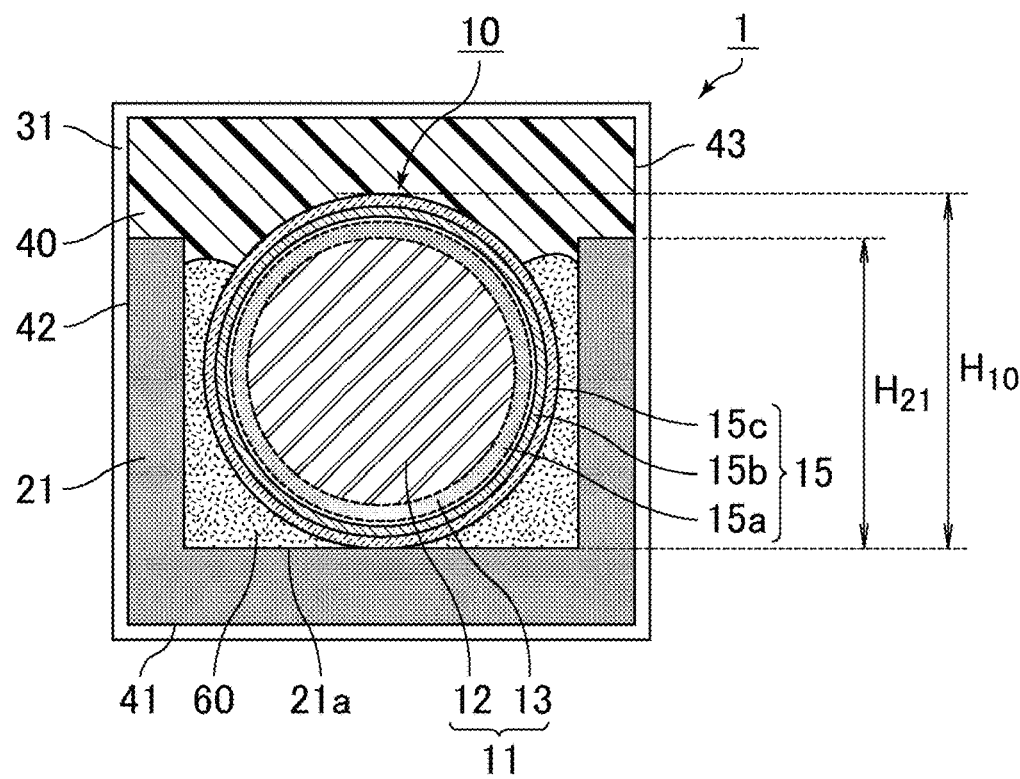
FIG. 3 is a sectional view of the solid electrolytic capacitor illustrated in FIG. 1, taken along line III-III.

In the present embodiment, an outer wall surface of the cathode terminal 21 is exposed at the bottom surface 41 and the side surface 42 of the sealing material 40. Although not illustrated in FIG. 1, the outer wall surface of the cathode terminal 21 is exposed also at the side surface 43 of the sealing material 40 (see FIG. 3). As illustrated in FIG. 3 referred to below, the cathode terminal 21, which has a portion exposed at the bottom surface 41, a portion exposed at the side surface 42, and a portion exposed at the side surface 43 of the sealing material 40, is an integral element. By exposing the cathode terminal not only at the bottom surface of the sealing material but also at the side surfaces of the sealing material in this way, a sufficient amount of fillet can be formed also on the side surfaces during a mounting operation, and thus high mounting strength can be obtained.

The anode terminal 31 is disposed on one end surface 44 of the sealing material 40, and the anode terminal 32 is disposed on the other end surface 45 of the sealing material 40. As described above, preferably, a solid electrolytic capacitor according to the present invention is a three-terminal capacitor that includes a pair of anode terminals on both end surfaces of a sealing material and that includes a cathode terminal on at least a bottom surface of the sealing material. However, a solid electrolytic capacitor according to the present invention is not limited to a three-terminal capacitor.

Figure 2:
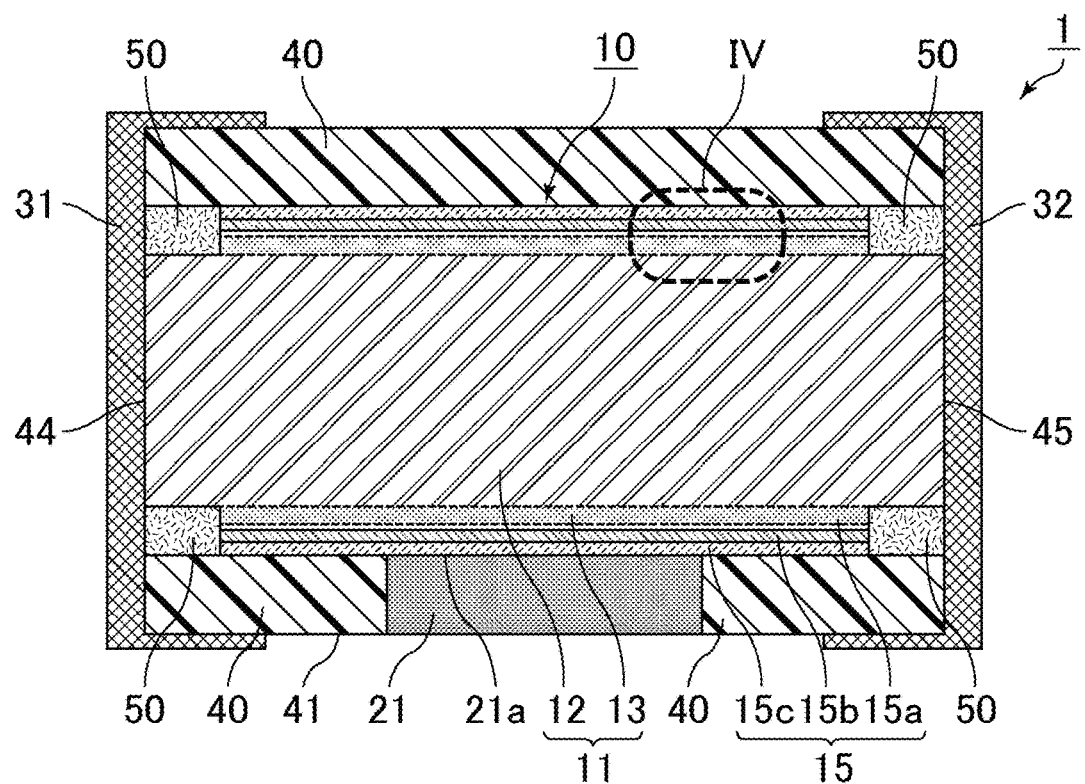
FIG. 2 is a sectional view of the solid electrolytic capacitor illustrated in FIG. 1, taken along line II-II.
Figure 4:
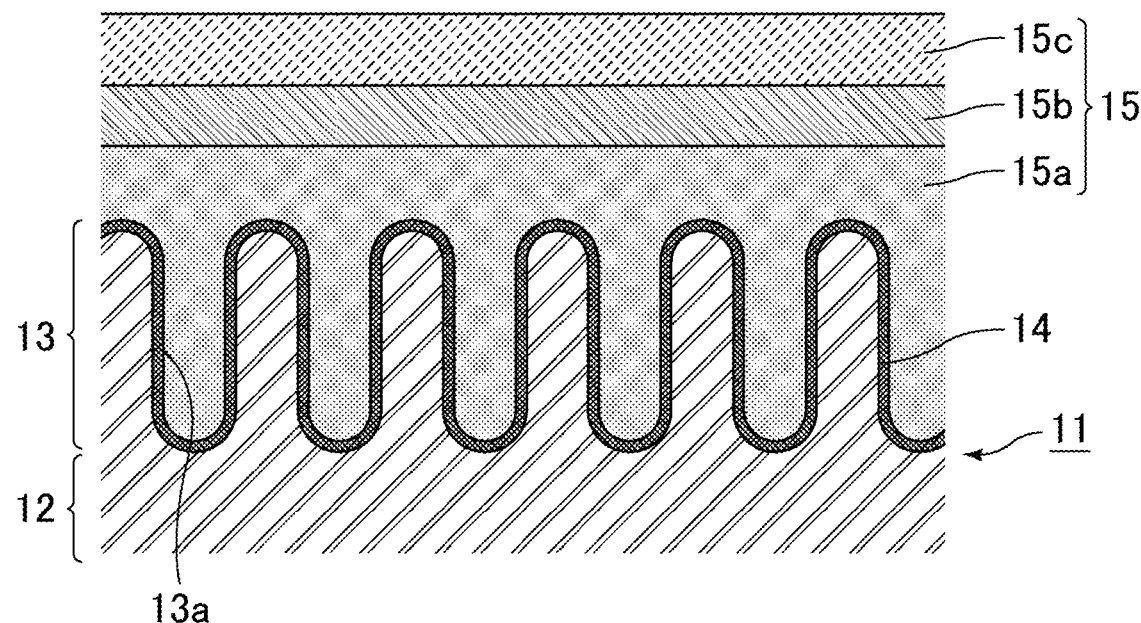
FIG. 4 is a schematic enlarged partial sectional view of a portion IV of the solid electrolytic capacitor illustrated in FIG. 2.

FIG. 2 is a sectional view of the solid electrolytic capacitor illustrated in FIG. 1, taken along line II-II. FIG. 3 is a sectional view of the solid electrolytic capacitor illustrated in FIG. 1, taken along line III-III. FIG. 4 is a schematic enlarged partial sectional view of a portion IV of the solid electrolytic capacitor illustrated in FIG. 2.

As illustrated in FIGS. 2, 3, and 4, the capacitor element 10 includes the valve metal substrate 11 including a porous portion 13 on a surface of a core portion 12, a dielectric layer 14 formed on a surface of the porous portion 13 (see FIG. 4), and a cathode layer 15 disposed on the dielectric layer 14. In the present embodiment, the cathode layer 15 includes a solid electrolyte layer 15a disposed on a surface of the dielectric layer 14, a carbon layer 15b disposed on a surface of the solid electrolyte layer 15a, and a silver layer 15c disposed on a surface of the carbon layer.

As illustrated in FIG. 4, a large number of pores 13a are formed in the surface of the porous portion 13 of the valve metal substrate 11. The dielectric layer 14 is porous due to the surface condition of the porous portion 13 and has a surface profile with very small depressions and protrusions. In FIG. 4, the surface profile of the porous portion 13 is shown by a wave-like line. However, this line schematically shows the surface profile of the porous portion 13, and, in reality, the porous portion 13 has a more complicated surface profile. In FIGS. 2 and 3, the porous portion 13 is shown as a region surrounded by dotted lines.

As illustrated in FIGS. 2 and 3, the cathode terminal 21 is electrically connected to the cathode layer 15 of the capacitor element 10. To be specific, the cathode layer 15 of the capacitor element 10 is connected to the recessed portion 21a of the cathode terminal 21. In FIG. 3, the cathode layer 15 of the capacitor element 10 is connected to the recessed portion 21a of the cathode terminal 21 via a conductive adhesive 60. However, in a solid electrolytic capacitor according to the present invention, for example, if a cathode layer includes a silver layer, the cathode layer may be directly connected to the recessed portion of the cathode terminal, because the silver layer functions also as a conductive adhesive.

The anode terminals 31 and 32 are electrically connected to the core portion 12 of the capacitor element 10. In FIG. 2, both end surfaces of the core portion 12 are exposed from the sealing material 40 and are respectively in contact with the pair of the anode terminals 31 and 32. The solid electrolytic capacitor 1 further includes insulating layers 50, for insulating the core portion 12 and the cathode layer 15 from each other, on a surface of the capacitor element 10. In FIG. 2, the insulating layers 50 are disposed between the cathode layer 15 and the anode terminal 31 and between the cathode layer 15 and the anode terminal 32.

As described above, in a solid electrolytic capacitor according to the present invention, a capacitor element is disposed in a recessed portion of a cathode terminal, and a cathode layer of the capacitor element is connected to the inner wall surface of the recessed portion. In this case, compared with a case where the cathode terminal does not have a recessed portion, the bonding area between the capacitor element and the cathode terminal is increased. Therefore, the equivalent series resistance (ESR) can be controlled to be low.

Moreover, because the capacitor element is covered by the recessed portion of the cathode terminal, it is possible to reduce an external force that the capacitor element receives due to flowing of a resin when sealing the capacitor element with a sealing material. As a result, deterioration of the electric characteristics can be suppressed.

In a solid electrolytic capacitor according to the present invention, preferably, the cathode terminal is made from a metal plate. In a case where a metal plate is used as the cathode terminal, a parasitic component in a high-frequency range can be reduced, compared with a case where a printed board made of a resin is used. Therefore, the reliability can be improved. Moreover, the reliability against heat can be improved, because a metal plate has high heat-releasing ability.

In a solid electrolytic capacitor according to the present invention, the length of the inner wall surface of the recessed portion in the axial direction is not particularly limited, as long as the inner wall surface covers a part or the entirety of the capacitor element.

In order to suppress increase of the ESR, preferably, the cathode layer of the capacitor element is connected to the inner wall surface of the recessed portion in a region having a length that is greater than or equal to 1/5 of the length of the capacitor element in the axial direction. More preferably, the cathode layer has a length such that the cathode layer reaches the insulating layers for insulating the core portion (anode portion) and the cathode layer (cathode portion) from each other. In the axial direction, the cathode layer of the capacitor element may be discontinuously connected to the inner wall surface of the recessed portion.

Table 1 shows the relationship between the ratio of the connection length between the inner wall surface of the recessed portion of the capacitor element to the length of the capacitor element and the ESR increase ratio. The number of samples N=50.

TABLE 1

| | Connection Length with Inner Wall Surface of Recessed portion/Length of Capacitor Element | | | |
|---|---|---|---|---|
| | 1/10 | 1/5 | 1/2 | 1/1 |
| ESR Increase Ratio | 5-10 | 1-1.1 | 1-1.1 | 1-1.05 |

The length of the capacitor element and the connection length between the inner wall surface of the recessed portion and the capacitor element are measured by using an image that is digitally processed with a microscope.

The ESR increase ratio is an ESR increase ratio at 100 kHz, which is obtained by using the following method. First, the cathode layer of the capacitor element is connected to the cathode terminal. Then, the ESR is measured by causing probes to directly contact exposed portions of the anode and the cathode of the capacitor element before being sealed with the sealing material. The measured value is denoted as $ESR_1$. Next, the capacitor element is sealed with the sealing material to obtain an individual chip. Then, the ESR is measured by causing the probes to directly contact the anode terminal and the cathode terminal of the capacitor element of the individual chip. The measured value is denoted as $ESR_2$. $ESR_2/ESR_1$ is calculated from $ESR_1$ and $ESR_2$, and the calculated value is defined as the ESR increase ratio. $ESR_1$ and $ESR_2$ are measured by using an LCR meter or an impedance analyzer.

In a solid electrolytic capacitor according to the present invention, the height of the inner wall surface of the recessed portion of the cathode terminal is not particularly limited, as long as the inner wall surface covers a part or the entirety of the capacitor element. In the height direction, the cathode layer of the capacitor element and the cathode terminal may be in contact with each other, or there may be a gap between the cathode layer of the capacitor element and the cathode terminal.

In order to suppress increase of the ESR, preferably, the cathode layer of the capacitor element is connected to the inner wall surface of the recessed portion in a region extending up to a height that is greater than or equal to ⅓ of the height of the capacitor element (a length indicated by double-headed arrow $H_{10}$ in FIG. 3). In the height direction, the cathode layer of the capacitor element may be discontinuously connected to the inner wall surface of the recessed portion.

Table 2 shows the relationship between the ratio of the connection height of the inner wall surface of the recessed portion and the capacitor element to the height of the capacitor element and the ESR increase ratio. The number of samples N=50.

TABLE 2

| | Connection Height with Inner Wall Surface of Recessed portion/Height of Capacitor Element | | |
|---|---|---|---|
| | 1/5 | 1/3 | 1/2 |
| ESR Increase Ratio | 1.5-3 | 1-1.1 | 1-1.1 |

The height of the capacitor element and the connection height between the inner wall surface of the recessed portion and the capacitor element are measured by using an image that is digitally processed with a microscope.

In order to suppress increase of the ESR, the height of the inner wall surface of the recessed portion (a length indicated by double-headed arrow $H_{21}$ in FIG. 3) is preferably greater than or equal to ⅓ of the height of the capacitor element, and more preferably, is greater than or substantially equal to the height of the capacitor element.

Table 3 shows the relationship between the ratio of the height of the inner wall surface of the recessed portion to the height of the capacitor element and the ESR increase ratio. The number of samples N=50.

TABLE 3

| | Height of Inner Wall Surface of Recessed portion/Height of Capacitor Element | | | | |
|---|---|---|---|---|---|
| | 1/5 | 1/3 | 1/2 | 1/1 | 1.2/1 |
| ESR Increase Ratio | 1.5-3 | 1-1.2 | 1-1.1 | 1-1.05 | 1-1.05 |

The height of the capacitor element and the height of the inner wall surface of the recessed portion are measured by using an image that is digitally processed with a microscope.

In a solid electrolytic capacitor according to the present invention, preferably, the outer wall surface of the cathode terminal is exposed at a bottom surface and a side surface of the sealing material. In this case, preferably, the height of the outer wall surface of the cathode terminal is the same as the height of the inner wall surface of the recessed portion. Accordingly, the height of the outer wall surface of the cathode terminal is preferably greater than or equal to ⅓ of the height of the capacitor element, and more preferably, is greater than or substantially equal to the height of the capacitor element. In FIG. 3, the height of the outer wall surface of the cathode terminal is a length indicated by double-headed arrow $H_{21}$, and is the same as the height of the inner wall surface of the recessed portion.

In a solid electrolytic capacitor according to the present invention, preferably, the cathode terminal that is exposed at the bottom surface and the side surface of the sealing material is an integral element. In this case, the outer wall surface of the cathode terminal that is exposed at the side surface of the sealing material may be a cut surface.

In a solid electrolytic capacitor according to the present invention, the length of the inner wall surface of the recessed portion in the width direction is not particularly limited. In the width direction, the cathode layer of the capacitor element and the cathode terminal may be in contact with each other, or there may be a gap between the cathode layer of the capacitor element and the cathode terminal.

Figure 5:
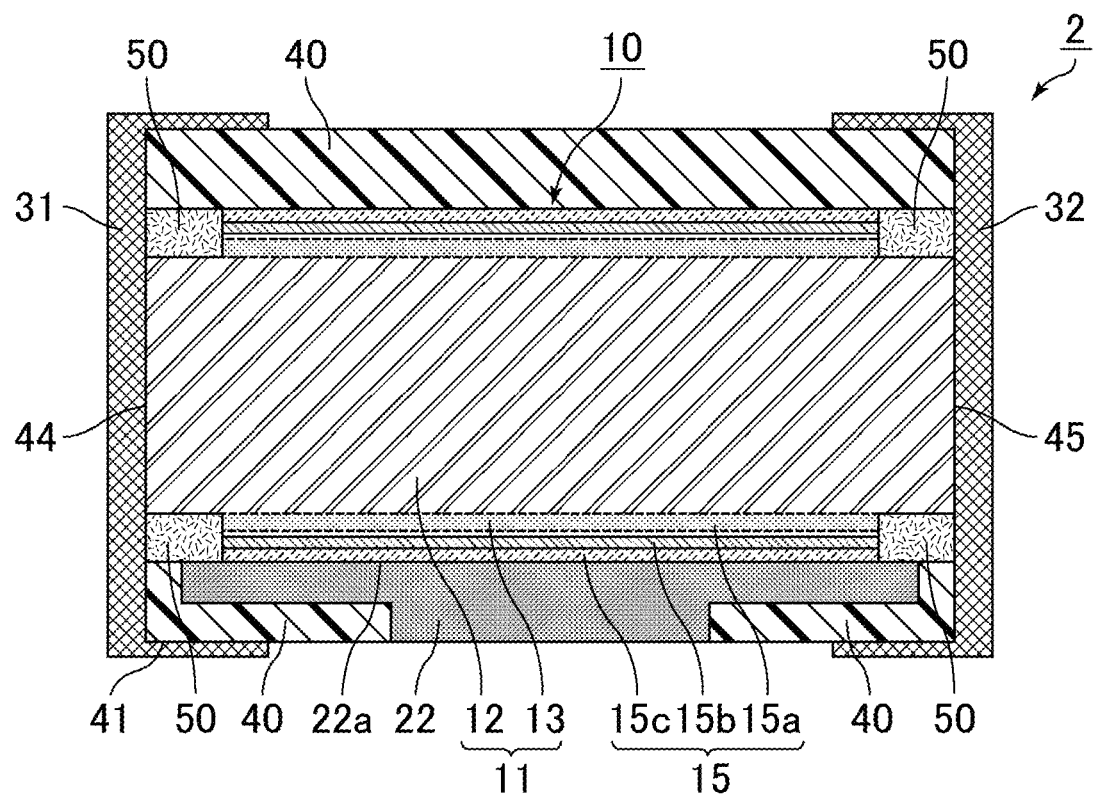
FIG. 5 is a schematic sectional view of a solid electrolytic capacitor according to a second embodiment of the present invention.

FIG. 5 is a schematic sectional view of a solid electrolytic capacitor according to a second embodiment of the present invention. In a solid electrolytic capacitor 2 illustrated in FIG. 5, the insulating layers 50 are disposed between the cathode layer 15 and the anode terminal 31 and between the cathode layer 15 and the anode terminal 32, and a cathode terminal 22 is in contact with the cathode layer 15 and the insulating layers 50. In this case, the equivalent series resistance (ESR) can be controlled to be low, because the conductive contact area can be increased.

In FIG. 5, the cathode terminal 22 is in contact with both of the insulating layer 50 between the cathode layer 15 and the anode terminal 31 and the insulating layer 50 between the cathode layer 15 and the anode terminal 32. However, the cathode terminal 22 may be in contact with only one of the insulating layers.

In FIG. 5, in the axial direction, the length of the inner wall surface of a recessed portion 22a of the cathode terminal 22 is greater than the length of the outer wall surface of the cathode terminal 22 that is exposed at the bottom surface 41 of the sealing material 40. However, it is sufficient that the length of the inner wall surface of the recessed portion is greater than or substantially equal to the length of the outer wall surface of the cathode terminal that is exposed at the bottom surface of the sealing material.

In a solid electrolytic capacitor according to the present invention, the shape of the recessed portion of the cathode terminal is not particularly limited. Preferably, the inner wall surface of the recessed portion has a shape that extends along the shape of the valve metal substrate.

Figure 6:
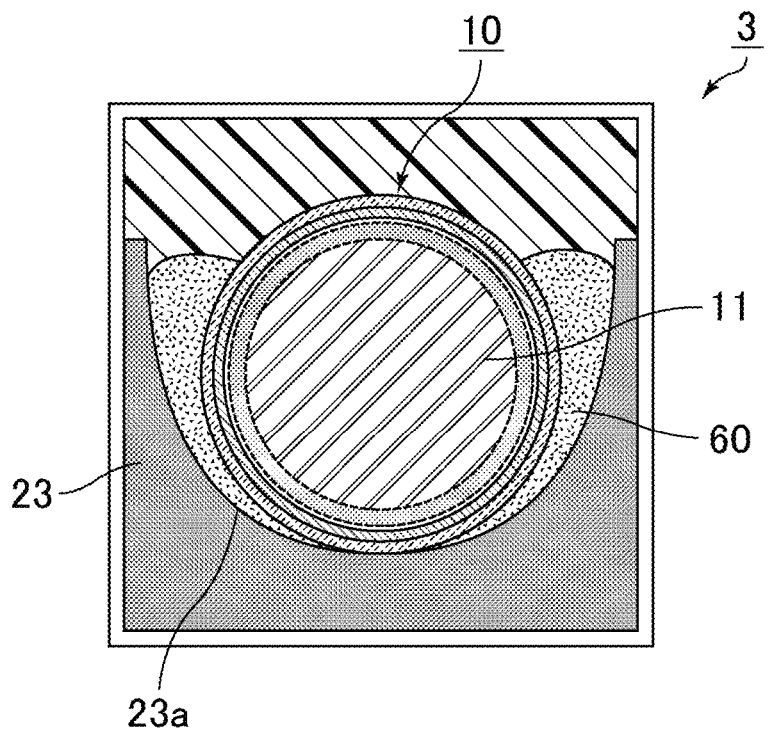
FIG. 6 is a schematic sectional view of a solid electrolytic capacitor according to a third embodiment of the present invention.

FIG. 6 is a schematic sectional view of a solid electrolytic capacitor according to a third embodiment of the present invention. In a solid electrolytic capacitor 3 illustrated in FIG. 6, the shape of the valve metal substrate 11 of the capacitor element 10 is a columnar shape having a curved surface, and the inner wall surface of a recessed portion 23a of a cathode terminal 23 has a curved shape extending along the shape of the valve metal substrate 11. In this case, the bonding reliability can be improved, because the amount of the conductive adhesive 60 can be reduced, compared with the solid electrolytic capacitor 1 illustrated in FIG. 3.

In a solid electrolytic capacitor according to the present invention, preferably, in the axial direction, the length of the inner wall surface of the recessed portion is greater than or substantially equal to the length of the outer wall surface of the cathode terminal that is exposed at the side surface of the sealing material. In this case, the equivalent series resistance (ESR) can be controlled to be low, because the conductive contact area can be increased. Moreover, a short circuit with the anode can be prevented, because the area of a leading-out portion can be reduced.

Figure 7:
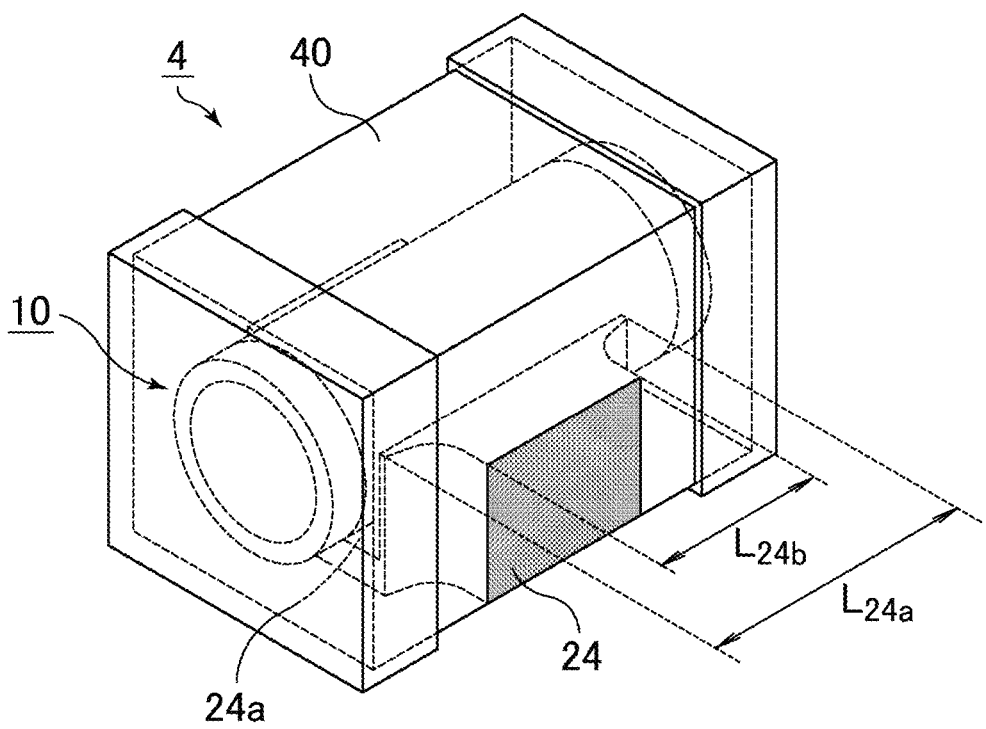
FIG. 7 is a schematic perspective view of a solid electrolytic capacitor according to a fourth embodiment of the present invention.

FIG. 7 is a schematic perspective view of a solid electrolytic capacitor according to a fourth embodiment of the present invention. In a solid electrolytic capacitor 4 illustrated FIG. 7, in the axial direction, the length of the inner wall surface of a recessed portion 24a of a cathode terminal 24 (a length indicated by double-headed arrow $L_{24a}$ in FIG. 7) is greater than the length of the outer wall surface of the cathode terminal that is exposed at the side surface the sealing material 40 (a length indicated by double-headed arrow $L_{24b}$ in FIG. 7). The shape of the cathode terminal 24 is not limited to the shape illustrated in FIG. 7.

Figure 8:
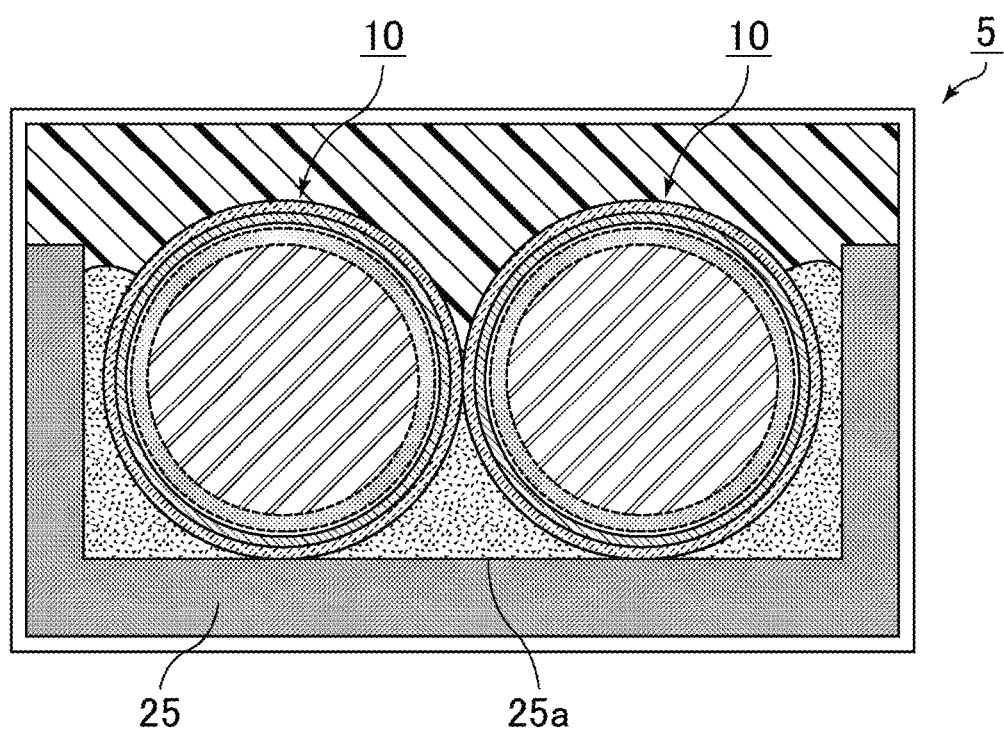
FIG. 8 is a schematic sectional view of a solid electrolytic capacitor according to a fifth embodiment of the present invention.

FIG. 8 is a schematic sectional view of a solid electrolytic capacitor according to a fifth embodiment of the present invention. In a solid electrolytic capacitor 5 illustrated in FIG. 8, two capacitor elements 10 are disposed in a recessed portion 25a of a cathode terminal 25.

As illustrated in FIG. 8, in a solid electrolytic capacitor according to the present invention, a plurality of capacitor elements may be disposed in the recessed portion of the cathode terminal. In this case, the plurality of capacitor elements may be arranged in the width direction as illustrated in FIG. 8, or the plurality of capacitor elements may be arranged in the height direction.

In a solid electrolytic capacitor according to the present invention, the cathode terminal may have a plurality of recessed portions, and the capacitor elements may be disposed in the respective recessed portions. In this case, the numbers of capacitor elements that are disposed in different recessed portions may be the same as or may differ from each other.

In a solid electrolytic capacitor according to the present invention, the valve metal substrate of the capacitor element is made of a valve metal that has a so-called valve function. Examples of the valve metal include metals, such as aluminum, tantalum, niobium, titanium, and zirconium; and alloys of any of these metals. Among these, aluminum or tantalum is preferable.

The shape of the valve metal substrate is not particularly limited, as long as the shape is a linear shape extending in the axial direction. However, the aspect ratio $H_B/W_B$ of the valve metal substrate is preferably 0.5 or higher and more preferably 1 or higher, where $W_B$ is the maximum length in the width direction and $H_B$ is the maximum length in the height direction.

Preferably, the shape of the valve metal substrate is a columnar shape having a curved surface. Examples of such a shape include a cylindrical shape, an elliptical cylindrical shape, and a prismatic shape whose edges are roundly chamfered.

The valve metal substrate includes the porous portion on a surface of the core portion. Preferably, the porous portion is an etching layer formed on the surface of the core portion.

In a solid electrolytic capacitor according to the present invention, the dielectric layer, which is formed on the surface of the porous portion, is made from an oxide coating of the valve metal. For example, in a case where an aluminum wire is used as the valve metal substrate, a dielectric layer can be made from an oxide coating by performing an anodic oxidation treatment (also referred to as a chemical conversion treatment) on the surface of the aluminum wire in an aqueous solution including ammonium adipate or the like.

In a solid electrolytic capacitor according to the present invention, preferably, as the cathode layer, a solid electrolyte layer is disposed on a surface of the dielectric layer. More preferably, a conductor layer is disposed on the surface of the solid electrolyte layer.

Examples of the material of the solid electrolytic layer include conductive polymers such as polypyrroles, polythiophenes, and polyanilines. Among these, polythiophenes are preferable, and poly(3,4-ethylenedioxythiophene), which is called PEDOT, is particularly preferable. The conductive polymers may include a dopant such as polystyrenesulfonic acid (PSS). Preferably, the solid electrolyte layer includes an inner layer that fills the pores (recessed portions) of the dielectric layer and an outer layer that covers the dielectric layer.

Preferably, the conductor layer includes a carbon layer, which is an underlying layer, and a silver layer on the carbon layer. However, the conductor layer may have only one of a carbon layer and a silver layer.

Preferably, a solid electrolytic capacitor according to the present invention further includes an insulating layer, for insulating the core portion and the cathode layer from each other, on the surface of the capacitor element. In particular, preferably, the insulating layer is disposed between the cathode layer and the anode terminal. Examples of the material of the insulating layer include a polyphenylsulfone resin, a polyethersulfone resin, a cyanate resin, fluororesins (such as tetrafluoroethylene, a tetrafluoroethylene-perfluoroalkylvinyl ether copolymer, and the like), a polyimide resin, a polyamide-imide resin, and derivatives or precursors of these resins.

In a solid electrolytic capacitor according to the present invention, the anode terminal is made of, for example, a metal such as nickel, zinc, copper, tin, gold, silver, palladium, or lead; a plating film that includes an alloy of any of these metals; or a conductive resin film that includes a conductive material, such as silver, copper, nickel, tin, or palladium. The anode terminal may have a multilayer structure including a plating film and a conductive resin film. For example, the anode terminal may include two plating layers and a conductive resin layer between the plating layers.

In a solid electrolytic capacitor according to the present invention, the sealing material includes, for example, a resin. Examples of a resin included in the sealing material include an epoxy resin and a phenolic resin. The sealing material may include, in addition to a resin, a filler such as alumina or silica, a magnetic material, and the like.

[Method of Manufacturing Solid Electrolytic Capacitor]

A method of manufacturing a solid electrolytic capacitor according the present invention includes, in a first aspect, a step of preparing at least one capacitor element, a step of mounting the capacitor element on a cathode terminal, a step of sealing the capacitor element mounted on the cathode terminal with a sealing material, and a step of forming an anode terminal. In the step of mounting the capacitor element on the cathode terminal, the capacitor element is placed in a recessed portion of the cathode terminal, and a cathode layer of the capacitor element is connected to an inner wall surface of the recessed portion.

Hereafter, referring to FIGS. 9(a) to 9(d), the method of manufacturing a solid electrolytic capacitor in the first aspect of the present invention will be described. FIGS. 9(a) to 9(d) are schematic perspective views illustrating an example of the method of manufacturing the solid electrolytic capacitor illustrated in FIG. 1.

Figure 9A:
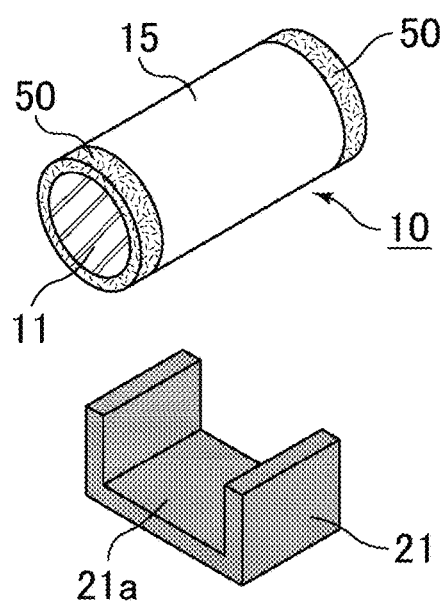
FIGS. 9(a) to 9(d) are schematic perspective views illustrating an example of a method of manufacturing the solid electrolytic capacitor illustrated in FIG. 1.

In the step illustrated in FIG. 9(a), the capacitor element 10 is prepared. The capacitor element 10 includes the valve metal substrate 11 having a linear shape extending in the axial direction. In a case where dicing is performed as described below, a capacitor element in which the length of the cathode layer 15 is the same as that of the capacitor element 10 illustrated in FIG. 1 and the length of each of the insulating layers 50 at both end portions is greater than that of the capacitor element 10 illustrated in FIG. 1 is prepared.

The capacitor element 10 is manufactured, for example, as follows. As the valve metal substrate 11, a cylindrical aluminum wire in which a porous portion has been formed on a surface of a core portion by performing an etching treatment and in which a dielectric layer has been formed on the surface of the porous portion by performing an anodic oxidation treatment is prepared. In addition, the insulating layers 50 are formed by applying an insulating resin around both end portions of the capacitor element 10 and by drying the insulating resin. The cathode layer 15 is formed by forming a solid electrolyte layer, a carbon layer, and a silver layer on a portion of the valve metal substrate 11 on which the insulating layers 50 are not formed.

FIG. 9(a) illustrates also the cathode terminal 21. The cathode terminal 21 has the recessed portion 21a, which has an inner wall surface extending in the axial direction. Preferably, the cathode terminal 21 is made from a metal plate.

Figure 9B:
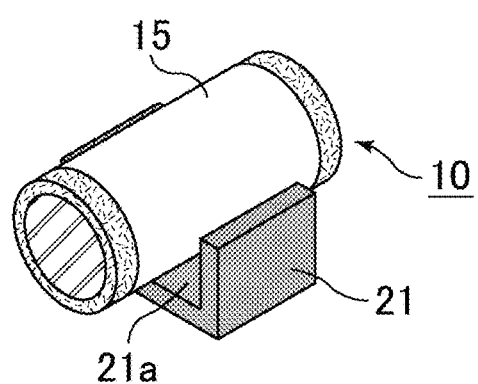

In the step illustrated in FIG. 9(b), the capacitor element 10 is mounted on the cathode terminal 21 by connecting the cathode layer 15 of the capacitor element 10 to the cathode terminal 21. In this step, the capacitor element 10 is placed on the recessed portion 21a of the cathode terminal 21, and the cathode layer 15 of the capacitor element 10 is connected to the inner wall surface of the recessed portion 21a. For example, as illustrated in FIG. 3, the cathode layer of the capacitor element can be connected to the recessed portion of the cathode terminal via a conductive adhesive.

Figure 9C:
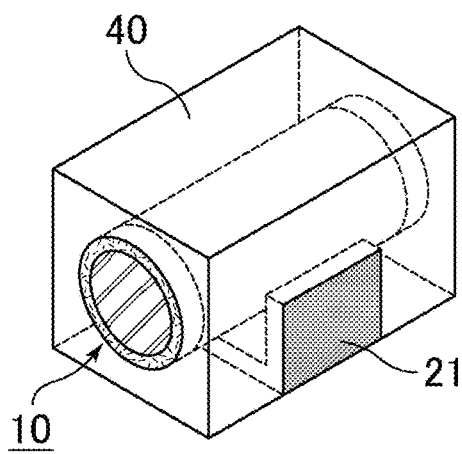

In the step illustrated in FIG. 9(c), the capacitor element 10 mounted on the cathode terminal 21 is sealed with the sealing material 40. In FIG. 9(c), the sealing material 40 is formed so that both end surfaces of the capacitor element 10 and the bottom surface and the side surface of the cathode terminal 21 are exposed. A method for exposing these surfaces may be polishing. However, dicing is preferable in order to obtain uniform exposed surfaces.

Figure 9D:
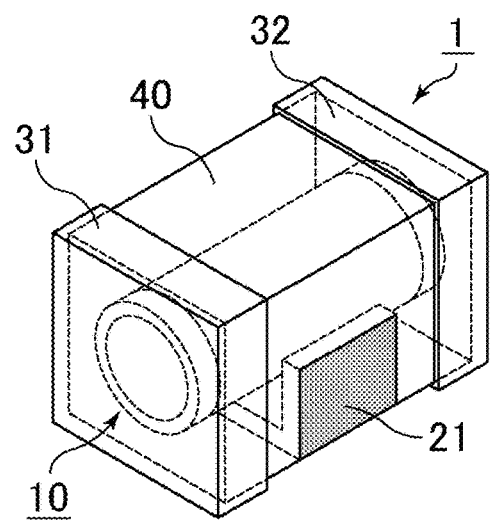

In the step illustrated in FIG. 9(d), the anode terminals 31 and 32, which are electrically connected to the core portion of the capacitor element 10, are formed. In FIG. 9(d), the anode terminals 31 and 32 are formed so as to be connected to both end surfaces of the capacitor element 10 that are exposed from the sealing material 40.

Through the steps described above, the solid electrolytic capacitor 1 illustrated in FIG. 1 is obtained. Other solid electrolytic capacitors can be manufactured by using a similar method.

A method of manufacturing a solid electrolytic capacitor according to present invention includes, in a second aspect, a step of preparing a plurality of capacitor elements, a step of mounting the plurality of capacitor elements on a collective frame that is to become cathode terminals, a step of simultaneously sealing the plurality of capacitor elements mounted on the collective frame with a sealing material, a step of dividing the collective frame to obtain a plurality of individual chips, and a step of forming an anode terminal on the capacitor element in each of the individual chips. In the step of mounting the plurality of capacitor elements on the collective frame, at least one of the capacitor elements is placed in each of recessed portions of the collective frame, and the cathode layer of the capacitor element is connected to the inner wall surface of the recessed portion.

Hereafter, referring to FIGS. 10(a) to 10(e), the method of manufacturing a solid electrolytic capacitor in the second aspect of the present invention will be described. FIGS. 10(a) to 10(e) are schematic perspective views illustrating an example of the method of manufacturing the solid electrolytic capacitor illustrated in FIG. 7.

Figure 10A:
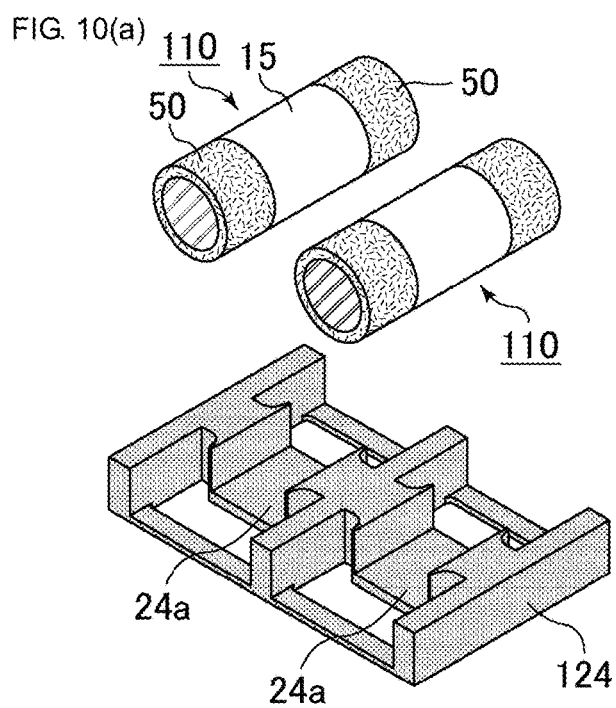
FIGS. 10(a) to 10(e) are schematic perspective views illustrating an example of a method of manufacturing the solid electrolytic capacitor illustrated in FIG. 7.
Figure 10B:
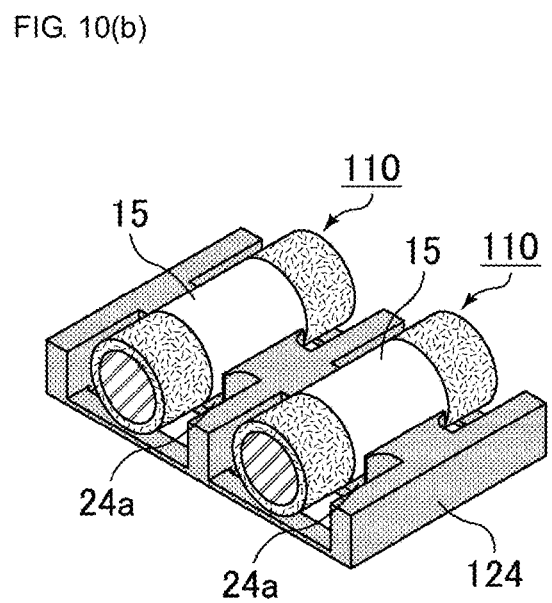
Figure 10C:
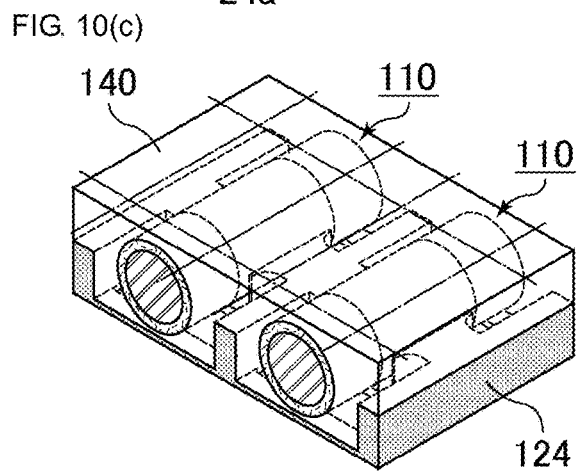

In the step illustrated in FIG. 10(a), two capacitor elements 110 are prepared. Each of the capacitor elements 110 includes the valve metal substrate 11 having a linear shape extending in the axial direction. In FIGS. 10(a) to 10(c), the capacitor elements 110, in each of which the length of the cathode layer 15 is the same as that of the capacitor element 10 illustrated in FIG. 7 and the length of each of the insulating layers 50 at both end portions is greater than that of the capacitor element 10 illustrated in FIG. 7, is prepared.

FIG. 10(a) illustrates a collective frame 124 that is to become the cathode terminals 24. The collective frame 124 has two recessed portions 24a each of which has an inner wall surface extending in the axial direction. Preferably, the collective frame 124 is made from a metal plate.

In the step illustrated in FIG. 10(b), the two capacitor elements 110 are mounted on the collective frame 124 by connecting the cathode layers 15 of the capacitor elements 110 to the collective frame 124. In this step, the capacitor elements 110 are placed in the respective recessed portions 24a of the collective frame 124, and the cathode layers 15 of the capacitor elements 110 are connected to the inner wall surfaces of the recessed portions 24a. For example, the cathode layers of the capacitor elements can be connected to the respective recessed portions of the collective frame via conductive adhesives.

In the step illustrated in FIG. 10(c), the two capacitor elements 110 mounted on the collective frame 124 are simultaneously sealed with a sealing material 140.

Figure 10D:
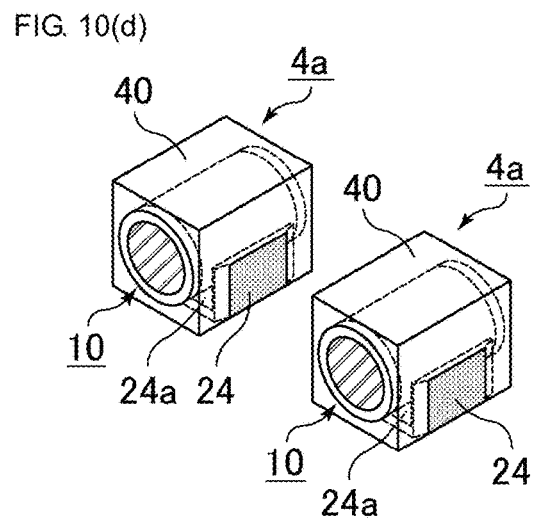
Figure 10E:
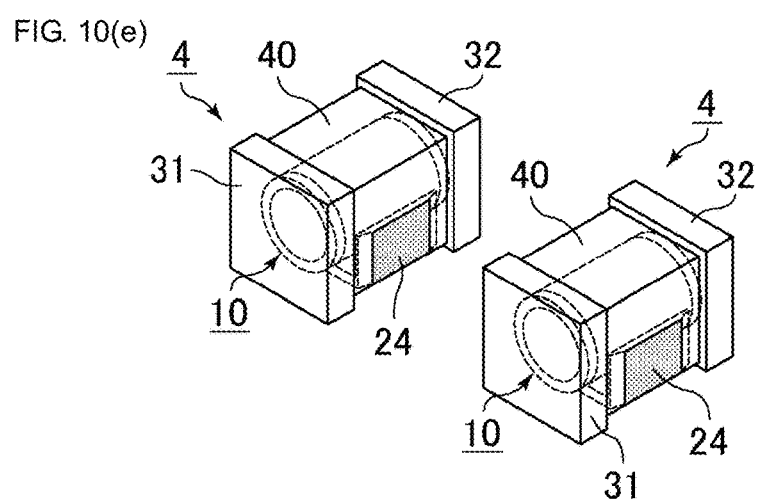

Subsequently, the collective frame is divided to obtain a plurality of individual chips. In this step, the collective frame is divided to obtain an appropriate number of individual chips in accordance with the number of recessed portions of the collective frame. FIG. 10(d) illustrates two chips 4a in each of which the capacitor element 10, which is disposed in the recessed portion 24a of the cathode terminal 24, is sealed with the sealing material 40. Dicing is preferable as the method of obtaining the individual chips. By performing dicing, both end surfaces of the capacitor element 10 and the bottom surface and the side surface of the cathode terminal 24 can be exposed. In this case, the outer wall surface of the cathode terminal 24 that is exposed at the side surface of the sealing material 40 is a cut surface.

In the step illustrated in FIG. 10(*e*), the anode terminals 31 and 32, which are electrically connected to the core portion of the capacitor elements 10 of the individual chips, are formed. In FIG. 10(*e*), the anode terminals 31 and 32 are formed so as to be connected to both end surfaces of each of the capacitor elements 10 that are exposed from the sealing material 40.

Through the steps described above, the solid electrolytic capacitors 4, each of which is illustrated in FIG. 7, are obtained. Other solid electrolytic capacitors can be manufactured by using a similar method.

A solid electrolytic capacitor according to the present invention is not limited to the embodiments described above. Regarding the structure of a solid electrolytic capacitor and the method of manufacturing a solid electrolyte capacitor, various applications and modifications are possible within the scope of the present invention.

REFERENCE SIGNS LIST 1, 2, 3, 4, 5 solid electrolytic capacitor
4*a* chip
10, 110 capacitor element
11 valve metal substrate
12 core portion
13 porous portion
13*a* pore
14 dielectric layer
15 cathode layer
15*a* solid electrolyte layer
15*b* carbon layer
15*c* silver layer
21, 22, 23, 24, 25 cathode terminal
21*a*, 22*a*, 23*a*, 24*a*, 25*a* recessed portion
31, 32 anode terminal
40, 140 sealing material
41 bottom surface of sealing material
42, 43 side surface of sealing material
44, 45 end surface of sealing material
46 upper surface of sealing material
50 insulating layer
60 conductive adhesive
124 collective frame

The invention claimed is:

1. A solid electrolytic capacitor comprising:
at least one capacitor element that includes a linear-shaped valve metal substrate that extends in an axial direction and includes a porous portion on a surface of a core portion, a dielectric layer on a surface of the porous portion, and a cathode layer on the dielectric layer;
a cathode terminal including a recessed portion having an inner wall surface extending in the axial direction, the at least one capacitor element being disposed in the recessed portion of the cathode terminal, and the cathode layer of the at least one capacitor element electrically connected to the inner wall surface of the recessed portion;
an anode terminal electrically connected to the core portion of the at least one capacitor element; and
a sealing material covering the at least one capacitor element,
wherein the sealing material has a bottom surface and a side surface adjacent to the bottom surface,
wherein an outer wall surface of the cathode terminal is exposed at the bottom surface and the side surface of the sealing material, and
wherein the cathode terminal that is exposed at the bottom surface and the side surface of the sealing material is an integral element.

2. The solid electrolytic capacitor according to claim 1, wherein the valve metal substrate has a columnar shape having a curved surface.

3. The solid electrolytic capacitor according to claim 2, wherein the inner wall surface of the recessed portion has a curved shape extending along the columnar shape of the valve metal substrate.

4. The solid electrolytic capacitor according to claim 1, wherein the inner wall surface of the recessed portion has a curved shape extending along a shape of the valve metal substrate.

5. The solid electrolytic capacitor according to claim 1, wherein the cathode terminal comprises a metal plate.

6. The solid electrolytic capacitor according to claim 1, further comprising:
an insulating layer on a surface of the at least one capacitor element so as to insulate the core portion and the cathode layer from each other,
wherein the cathode terminal is in contact with the cathode layer and the insulating layer.

7. The solid electrolytic capacitor according to claim 1, wherein the cathode layer of the at least one capacitor element is connected to the inner wall surface of the recessed portion in a region having a length that is greater than or equal to $\frac{1}{3}$ of a length of the at least one capacitor element in the axial direction.

8. The solid electrolytic capacitor according to claim 1, wherein the cathode layer of the at least one capacitor element is connected to the inner wall surface of the recessed portion in a region extending up to a height that is greater than or equal to $\frac{1}{3}$ of a height of the at least one capacitor element.

9. The solid electrolytic capacitor according to claim 1, wherein a height of the inner wall surface of the recessed portion is greater than or equal to $\frac{1}{3}$ of a height of the at least one capacitor element.

10. The solid electrolytic capacitor according to claim 9, wherein the height of the inner wall surface of the recessed portion is greater than or equal to the height of the at least one capacitor element.

11. The solid electrolytic capacitor according to claim 1, wherein, in the axial direction, a length of the inner wall surface of the recessed portion is greater than or equal to a length of the outer wall surface of the cathode terminal that is exposed at the side surface of the sealing material.

12. The solid electrolytic capacitor according to claim 1, wherein the anode terminal is a first anode terminal electrically connected to a first end of the core portion, the cathode terminal is exposed at least on a bottom surface of the sealing material, and the solid electrolytic capacitor further includes a second anode terminal electrically connected to a second end of the core portion opposite the first end.

13. The solid electrolytic capacitor according to claim 1, further comprising a conductive adhesive that electrically connects the cathode layer of the at least one capacitor element to the inner wall surface of the recessed portion.

14. A method of manufacturing a solid electrolytic capacitor, comprising:
preparing at least one capacitor element that includes a linear-shaped valve metal substrate that extends in an axial direction and includes a porous portion on a surface of a core portion, a dielectric layer on a surface of the porous portion, and a cathode layer on the dielectric layer;

mounting the capacitor element on a cathode terminal that includes a recessed portion having an inner wall surface extending in the axial direction by placing the at least one capacitor element in the recessed portion and electrically connecting the cathode layer of the at least one capacitor element to the inner wall surface of the recessed portion;

sealing the at least one capacitor element mounted on the cathode terminal with a sealing material; and electrically connecting an anode terminal to the core portion of the at least one capacitor element, wherein the sealing material has a bottom surface and a side surface adjacent to the bottom surface, wherein an outer wall surface of the cathode terminal is exposed at the bottom surface and the side surface of the sealing material, and wherein the cathode terminal that is exposed at the bottom surface and the side surface of the sealing material is an integral element.

15. The method of manufacturing a solid electrolytic capacitor according to claim 14, further comprising:

forming an insulating layer on a surface of the at least one capacitor element so as to insulate the core portion and the cathode layer from each other.

16. The method of manufacturing a solid electrolytic capacitor according to claim 15, wherein the cathode terminal is in contact with the cathode layer and the insulating layer.

17. The method of manufacturing a solid electrolytic capacitor according to claim 14, wherein the valve metal substrate has a columnar shape having a curved surface.

18. The method of manufacturing a solid electrolytic capacitor according to claim 17, wherein the inner wall surface of the recessed portion has a curved shape extending along the columnar shape of the valve metal substrate.

19. The method of manufacturing a solid electrolytic capacitor according to claim 14, wherein the inner wall surface of the recessed portion has a curved shape extending along a shape of the valve metal substrate.

20. The method of manufacturing a solid electrolytic capacitor according to claim 14, wherein the cathode terminal comprises a metal plate.

21. The method of manufacturing a solid electrolytic capacitor according to claim 14, wherein the cathode layer of the at least one capacitor element is connected to the inner wall surface of the recessed portion in a region having a length that is greater than or equal to $1/5$ of a length of the at least one capacitor element in the axial direction.

* * * * *